United States Patent Office 3,091,538
Patented May 28, 1963

3,091,538
HIGH PROTEIN WHEAT PRODUCT AND METHOD
OF PRODUCING THE SAME
Tewfic Zacharia, Beirut, Lebanon, assignor to Proto, International Hygienic Food Co., a collective company of Lebanon
No Drawing. Filed Apr. 11, 1960, Ser. No. 21,090
7 Claims. (Cl. 99—90)

This invention relates to the production of wheat products which have good baking properties and are useful in the production of high protein-baked products of high nutritive value. The invention also includes novel wheat products produced in accordance with the aforementioned method.

As is well known to the art, soya flour, which is higher in protein content than the conventionally used flours in the production of baked products, has not been used to any extent as a baking flour because of the poor baking properties of a dough containing a significant amount of soya flour.

Objects and advantages of the invention will be set forth in part hereinafter and in part will be obvious herefrom, or may be learned by practice with the invention, the same being realized and attained by means of the steps, methods and compositions pointed out in the appended claims.

The invention consists in the novel steps, methods and compositions herein described.

It is an object of this invention to provide a novel method for the production of wheat products which have good baking properties and are useful in the production of high protein-baked products of high nutritive value. A further object of this invention is to provide a novel method for the production of products containing defatted soya flour which have good baking properties and are useful in the production of high protein wheat products of high nutritive value. Yet a further object of this invention is to provide novel products produced in accordance with the methods of the foregoing objects.

It has been found that the objects of this invention may be realized by combining in amounts set forth in detail hereinafter: [1] a moist wheat endosperm in which the proteins therein have been hydrolyzed to an extent described in detail hereinafter; and [2] defatted soya flour.

The wheat endosperm used in accordance with the present invention is well known and is described in detail in my prior U.S. Patent 2,895,831.

As indicated hereinabove, the "moist endosperm" used in accordance with this invention is formed by treating (i.e., kneading) the endosperm with water to hydrolyze the protein. As will be evident to those skilled in the art, the extent of hydrolysis of the protein may be based on the amount of starch removed from the endosperm in the production of "moist endosperm" or what is referred to in my prior U.S. Patent 2,895,831 as "endosperm residue."

In my prior Patent No. 2,895,831, patented July 21, 1959, I disclosed a method of manufacture of a wheat product of high nutritive value, stability, versatility and relatively low calorie content by combining a moist endosperm residue containing about 50 to 65% by weight water, about 22 to 30% by weight protein and about 15 to about 20% by weight starch, and a flour containing fine bran and germ, said flour being in an amount from about 20 to 25 parts per 100 parts of moist endosperm. Wheat products of the aforementioned type possess good uniformity, elasticity and compatibility with other flours.

In order that the wheat products of my prior Patent No. 2,895,831 have high protein content, it was essential that the moist endosperm residue have a low starch content. The moist endosperm residue had to contain sufficient starch, however, so that the resulting product of moist endosperm residue and flour containing fine bran and germ be compatible with conventional flours.

While the "moist endosperm" of my prior Patent No. 2,895,831 (referred to therein as "endosperm residue") may be combined with defatted soya flour in accordance with the present invention, I have found that the "moist endosperm" useful in the present invention may contain starch over a much wider range than required for the moist endosperm ("endosperm residue") in the invention disclosed in my U.S. Patent No. 2,895,831. The reason for this is that the wheat product of my U.S. Patent No. 2,895,831 may be used generally with conventional flours of relatively high starch-low protein content, while the present invention is concerned with the combination of a moist endosperm and a high protein flour which is not considered to be a good baking flour.

Accordingly, the moist endosperm useful in accordance with the present invention is endosperm which has been treated with water wherin the amount of removed starch is from about 5 to about 85% by weight of the amount of starch initially present in the endosperm prior to treatment with water.

The procedures and techniques for the hydrolysis of proteins in the endosperm, i.e., treatment with water resulting in removal of starch from the endosperm, is described in detail in my U.S. Patent No. 2,895,831. In columns 3 and 4 of this patent, there are disclosed the preferred conditions with respect to pH of water, hardness of water, temperature of kneading, test for starch content, etc.; all of these principles being applicable to the production of the moist endosperm useful in accordance with the present invention.

As indicated hereinbefore, it has been found that the combination of moist endosperm and defatted soya flour results in a product of high protein content and good baking properties. The introduction of defatted soya flour to the resulting moist endosperm serves, moreover, to help correct the amino acid deficiency of wheat flour notably in lysine, which is in low proportion in wheat, and high proportion in soya flour. Thus, the protein content of baked goods made with this product will have more nearly the constitution of a whole protein, with a consequent higher nutritive value. Alternatively, the process of producing the moist endosperm, which involves the use of water, permits an effective method of enhancing the lysine content to any desired degree, by dissolving lysine hydrochloride in the desired proportion in water and adding it to the moist endosperm at the conclusion of the extracting process, thus insuring an effective dispersion superior to that afforded by dry mixing. Another advantage claimed for this wet procedure is that it allows for the treatment of the endosperm in the wet state, with proteolytic enzymes, trypsin, pepsin, papain and the like, for the purpose of further tenderizing the enhanced protein content and promoting better baking qualities.

If so desired, the wheat product of this invention may be dried to facilitate shipment and later mixed with water to form a dough in the production of baked products. Any suitable drying techniques may be used whereby the "vital characteristics" of the product are preserved, the protein thereof remaining in an undegraded condition. The preferred drying technique is the "spray drying" method disclosed hereinafter in detail.

The moist endosperm may be dried before or after it is combined with the defatted soya flour. In the process of my prior Patent No. 2,895,831, it was essential that the moist endosperm be combined with a flour containing fine bran and germ in order that the resulting product be compatible with other flours, as well as providing minerals and vitamins. In accordance with the present invention, it has been found that moist endosperm is readily compatible with soya flour without the necessity of adding another flour containing bran and germ, although such a flour may be included if so desired, not only for the purpose of increasing the mineral and vitamin content, but, more significantly, because the addition of such flour (flour No. 2 of my prior Patent No. 2,895,831), because of its peculiar structure, enhances the structure of the resulting baked products, conferring upon them lightness; moreover the palatability and digestibility of the product is improved.

The relative amounts of moist endosperm and defatted soya vary depending upon the desired properties of the final product. In order to obtain a wheat product having excellent baking properties, the defatted soya flour is in an amount from about 10 to about 80 parts per 100 parts of moist endosperm on a dry weight basis. While the amount of water in the wheat product of this invention varies depending upon the plasticity of the dough desired, the water is generally in an amount from about 45 to 65% by weight of the moist endosperm.

The wheat product of the present invention containing defatted soya flour and moist endosperm may be readily combined with conventional food components, including milk, etc., in the manufacture of various food products, such, for example, as cereals, biscuits, and the like.

An example of a defatted soya bean flour useful in accordance with this invention is one having the following composition:

|  | Percent |
|---|---|
| Protein | 53.0 |
| Fat | 0.8 |
| Fiber | 2.0 |
| N-free extract | 30.0 |
| Ash | 6.0 |

The following examples illustrate the preparation of food products in accordance with the present invention.

EXAMPLE 1

The moist endosperm residue formed in accordance with Example 3 of my U.S. Patent No. 2,895,831 (i.e., one kilo of endosperm is kneaded with water to produce 1,000 grams of moist endosperm) is mixed with 150 grams of defatted soya flour to form a dough. When this dough is baked there results a biscuit containing about 40% protein.

EXAMPLE 2

One kilo of endosperm is kneaded with water in accordance with the procedure of Example 1 of my U.S. Patent No. 2,895,831 to produce 500 grams moist endosperm. This moist endosperm is mixed with 150 grams defatted soya flour to form a dough. When this dough is baked, there results a biscuit containing about 62% protein.

EXAMPLE 3

One kilo of endosperm is kneaded with water in accordance with the procedure of Example 1 of my U.S. Patent No. 2,895,831 to produce 1250 grams of moist endosperm. This moist endosperm is mixed with 150 grams defatted soya flour to form a dough. When this dough is baked there results a biscuit containing about 35% protein.

As indicated heretofore, the preferred method for drying the wheat product of this invention is spray drying. In prior methods for drying high protein wheat products by spray drying, it has been necessary to treat the material to be sprayed with certain agents such, for example, as organic acids or to incorporate in the material to be sprayed an emulsifying agent in order to obtain a slurry capable of being spray dried effectively. I have found, however, that the moist endosperm used in the present invention may be effectively spray dried without acid treatment or the addition of an emulsifying agent. I have also discovered that the incorporation of defatted soya flour in the moist endosperm facilitates spray drying operations, the defatted soya flour rendering the composition emulsifiable.

In carrying out the spray drying of the moist endosperm or moist endosperm combined with defatted soya flour, the moist endosperm should not be subjected to a temperature greater than about 150° F., and, preferably, not greater than about 124° F., in order that the endosperm maintains its vitalized characteristics. As will be evident to those skilled in the field, in carrying out the spray drying of the wheat product of this invention, the product to be dried is dispersed in water to make a slurry. The slurry may contain as high as 25% solids. It has been found excellent results are obtained when the nozzle aperture does not exceed 1/8". Also, either nozzle atomizing or disc atomizing is useable.

In Table 1 which follows are examples of the spray drying technique used in accordance with the present invention.

Sample A relates to the combination of the moist endosperm formed in accordance with Example 2 (no defatted soya added) with flour No. 2 of my prior Patent No. 2,895,831. The amount of flour No. 2 is 1/5 by weight of the moist endosperm. Sample A, when dried, may be subsequently mixed with defatted soya flour in accordance with the present invention, the resulting product being mixed with an appropriate amount of water in order to form a dough.

Sample B relates to the wheat product of this invention formed in accordance with the hereinafter disclosed Example 2, i.e., the combination of moist endosperm and soya flour in accordance with the present invention.

Sample C relates to the moist endosperm formed in accordance with Example 2 (no defatted soya or flour No. 2 added). Sample C, when dried, may be subsequently mixed with defatted soya flour in accordance with the present invention, the resulting product being mixed with an appropriate amount of water in order to form a dough.

Table 1

| Run No. | 1 | 2 | 3 | 4 | 5 | 6 | 7 |
|---|---|---|---|---|---|---|---|
| Feed conditions: | | | | | | | |
| Feed make-up | Sample A.—Agitated in Waring Blendor. Screened through 16 mesh. | Sample A.—Agitated in Waring Blendor. Screened through 16 mesh. | Sample A.—Agitated in Waring Blendor. Screened through 16 mesh. | Sample A.—Agitated in Waring Blendor. Screened through 16 mesh. | Sample B.—Simple agitation. | Sample B.—Simple agitation. | Sample C.—Free $H_2O$ decanted. Mixed in Waring Blendor. |
| Weight percent solids | 15.0 | 15.0 | 15.0 | 15.0 | 13.0 | 13.0 | 21.3. |
| Specific gravity, gm./ml | 1.05 | 1.05 | 1.05 | 1.05 | 1.05 | 1.05 | 1.000. |
| Feed temp., °F | Room temp | Room temp | Room temp | Room temp | Room temp | Room temp | Room temp. |
| Feed rate, ml./min | 115-133 | 150-170 | 166-270 | 143-200 | 110-154 | 166-208 | 142-180. |
| Type | Slurry | Slurry | Slurry | Slurry | Slurry | Slurry | Slurry. |
| Amount fed, ml | 1,420 | 1,700 | 5,000 | 3,000 | 5,000 | 4,500 | 2,650. |
| Operating conditions: | | | | | | | |
| Inlet temp., °F | 275 | 400 | 500 | 275 | 275-300 | 500 | 400. |
| Outlet temp., °F | 220-195 | 260-250 | 310-280 | 160 | 210-180 | 300 | 280-260. |
| Upper cold air ports | Closed | Closed | Closed | Closed | Closed | Closed | Closed. |
| Lower cold air ports | do | do | do | do | do | do | Do. |
| Type heat | Direct gas | Direct gas | Direct gas | Direct gas | Direct gas | Direct gas | Direct gas. |
| Atomizer type | Nozzle SS#5 ⅛" orifice. | Nozzle SS#5 ⅛" orifice. | Nozzle SS#5 ⅛" orifice. | Nozzle SS#5 ⅛" orifice. | Nozzle SS#5 ⅛" orifice. | Nozzle SS#5 ⅛" orifice. | Nozzle SS#5 ⅛" orifice. |
| Atomizer air pres., p.s.i.g | 100 | 100 | 100 | 100 | 100 | 100 | 100. |
| Ambient dry bulb, °F | 72 | 71 | 74 | 75 | 79 | 80 | 83. |
| Ambient wet bulb, °F | 61 | 60 | 63 | 67 | 72 | 72 | 75. |
| Chamber accumulation | Heavy, concentrated in one spot on cone. | Heavy, concentrated in one spot one cone. | Heavy, concentrated in one spot on cone. | Heavy, concentrated in one spot on cone. | Heavy, concentrated in one spot on cone. | Heavy, concentrated in one spot on cone. | Heavy, concentrated in one spot on cone. |
| Product conditions: | | | | | | | |
| Collector product, gm | 95 | 110 | 230 | 130 | 230 | 325 | 185. |
| Chamber product, gm | 85 | 155 | 520 | 120 | 290 | 385 | 190. |
| Total product, gm | 180 | 265 | 750 | 250 | 520 | 710 | 375. |
| Percent Recovery (wet basis) | 80.0 | 100.0+ | 99.3 | 55.2 | 79.7 | 100.0+ | 66.3. |
| Color | Light tan | Light tan | Light tan | Light tan | Light tan | Light tan | Light tan. |
| Flow characteristics | Free flowing | Free flowing | Free flowing | Free flowing | Free flowing | Free flowing | Free flowing. |

NOTE.—Chamber washed out after run.

The invention in its broader aspects is not limited to the specific steps, methods and compositions described but departures may be made therefrom within the scope of the accompanying claims without departing from the principles of the invention and without sacrificing its chief advantages.

What is claimed is:

1. A wheat product of high protein content and good baking properties when made into a dough, comprising defatted soya flour and wheat endosperm in which starch has been removed therefrom in an amount from about 5 to about 85% by weight of the starch initially present in the endosperm by contacting said endosperm with water, the defatted soya flour being in an amount from about 10 to 80 parts per 100 parts of the endosperm based on dry weight basis.

2. A wheat product of high protein content and good baking properties when made into a dough according to claim 1, wherein the wheat endosperm is in a moistened state.

3. A wheat product of high protein content and good baking properties when made into a dough according to claim 1, wherein the wheat endosperm is in a dry vitalized state.

4. The method of producing a wheat product of high protein content and good baking properties comprising, contacting wheat endosperm with water so as to remove therefrom from about 5 to about 85% by weight of starch initially present in the endosperm, and mixing the starch reduced endosperm with defatted soya flour, in an amount from about 10 to 80 parts per 100 parts of the endosperm based on a dry weight basis.

5. The method of producing a wheat product of high protein content and good baking properties according to claim 4, wherein the endosperm which is mixed with the defatted soya flour is in a moistened state.

6. The method of producing a wheat product of high protein content and good baking properties according to claim 4, wherein the endosperm which is mixed with the defatted soya flour is in a dry vitalized state.

7. The method of producing a wheat product of high protein content and good baking properties comprising contacting wheat endosperm with water so as to remove therefrom about 5 to about 85% by weight of starch initially present in the endosperm and leave a moist endosperm, mixing said moist endosperm with defatted soya flour in an amount from about 10 to 80 parts per 100 parts of the endosperm based on a dry weight basis, and drying the resulting product by spray drying.

References Cited in the file of this patent

UNITED STATES PATENTS

| 2,797,212 | Miley et al. | June 25, 1957 |
| 2,895,831 | Zacharia | July 21, 1959 |

FOREIGN PATENTS

| 499,106 | Great Britain | Jan. 16, 1939 |

OTHER REFERENCES

"The Bakers Digest," December 1942, pp. 282–284.